June 17, 1930.  E. K. MORGAN  1,763,717
TAPPING CHUCK
Filed Aug. 11, 1924
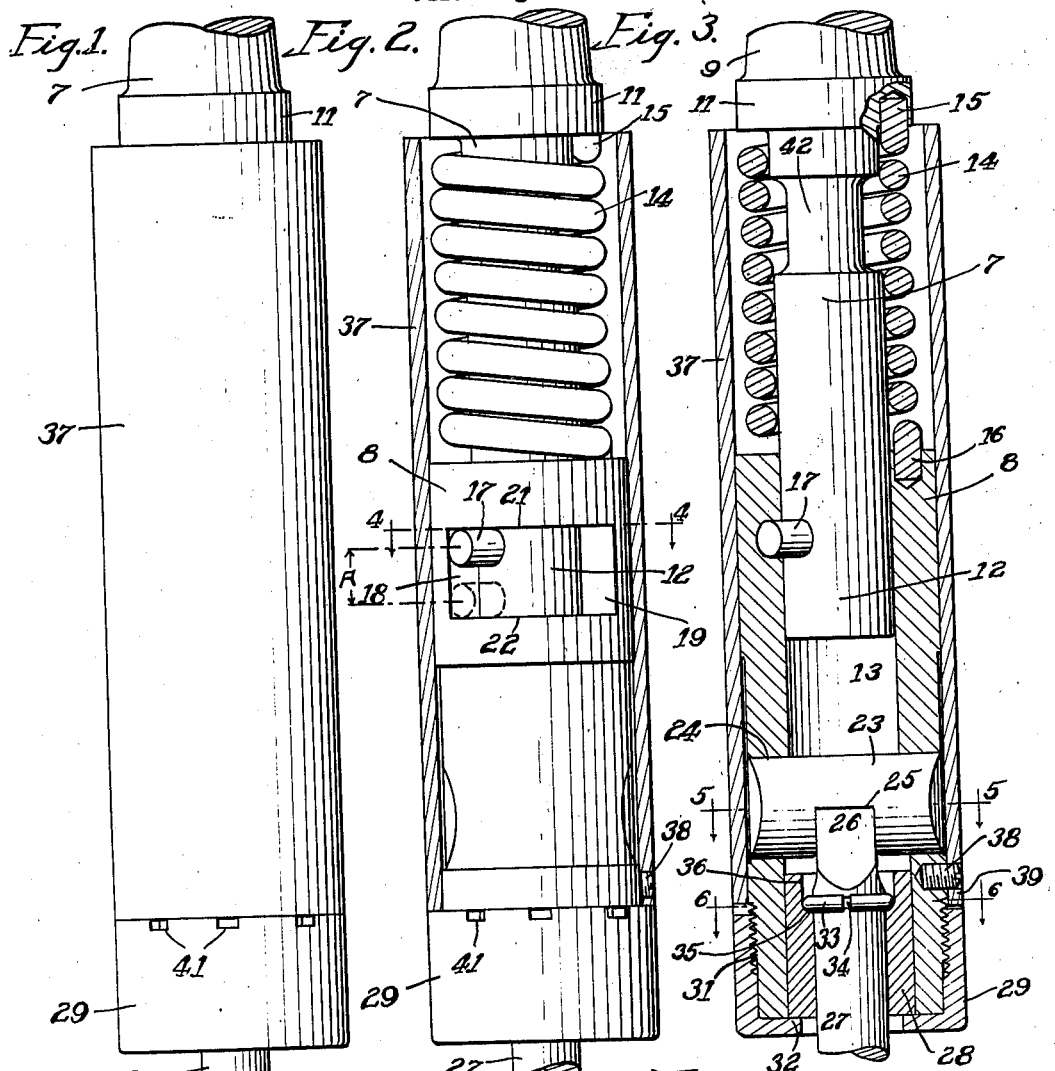
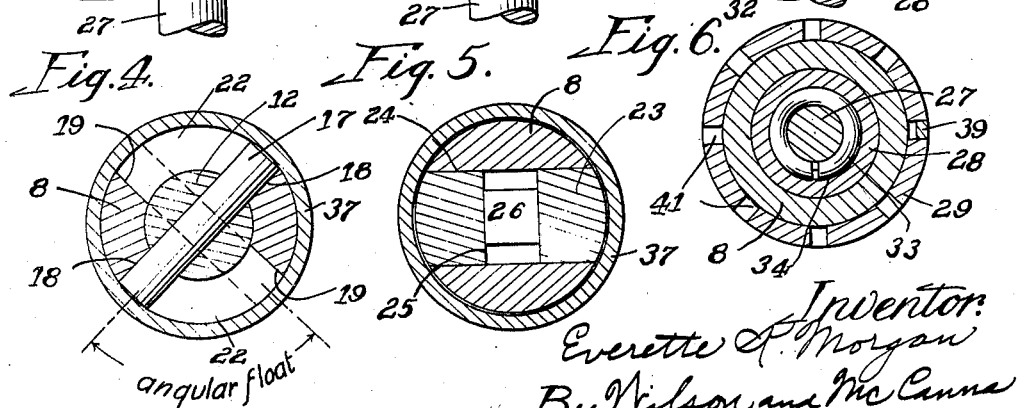
Inventor:
Everette K. Morgan
By Wilson and McCanna
Attys.

Patented June 17, 1930

1,763,717

UNITED STATES PATENT OFFICE

EVERETTE K. MORGAN, OF ROCKFORD, ILLINOIS, ASSIGNOR TO THE INGERSOLL MILLING MACHINE COMPANY, OF ROCKFORD, ILLINOIS, A CORPORATION OF ILLINOIS

TAPPING CHUCK

Application filed August 11, 1924. Serial No. 731,359.

This invention relates in general to chucks for holding tools, work-pieces or rod-like bodies and has more particular reference to socket type chucks especially adapted for holding tapping tools. My invention may, however, be utilized in holding tools other than taps, as will be readily apparent from the following.

One of the primary objects of my invention is to provide an improved chuck very desirable for use in multiple tapping machines. Heretofore considerable difficulty has been experienced in machines of this kind due to tap and chuck breakages and to excessive strains set up at the point of reversing the taps for withdrawing them. Where a multiplicity of taps are used in a single operation the threads per inch often vary considerably and the surfaces which the taps enter are at different levels, thereby making it impossible for the taps to enter under uniform conditions, with the result that breakages are frequent. Such breakages are reduced to a minimum by my invention which provides both angular and longitudinal float for the tap holder with respect to the driving shank, such float being against a yielding pressure such as a combined torsion and compression spring whereby the taps are started into the work under a spring tension. Thus any excessive or detrimental shock is avoided and as the tapping operation progresses the action of each individual tap simulates that of a hand operated tap in that each tap establishes its own lead and there is a certain degree of yield. At the end of the tapping operation the springs are under considerable torsion and this pressure is utilized very effectively when the machine is reversed in aiding to overcome the enormous load incident to loosening and starting the taps back.

Another purpose is to provide an improved tap or tool holding means whereby the tap will be positively but releasably held in the chuck body and will not pull out during the backing off operation and whereby the tap may be readily removed or replaced.

Another purpose is to provide as a safety factor, means for avoiding breakage of or injury to the chuck in the event that the tap breaks. To this end I have so constructed the chuck that the shank will bend under the lateral pressure on the lower end of the chuck resulting from the break as will be described hereinafter, causing the lower end of the chuck to be thrown out of alignment so as to avoid interference with the projecting tap jammed in the work.

Still another purpose of my invention is to provide a chuck the construction of which lends itself to complete enclosure of the working parts and which may be readily adapted to various size taps and other tools.

I have also aimed to so construct the chuck that it may be produced at a comparatively low cost and will serve in a practical and satisfactory manner the purposes intended.

Other objects and attendant advantages will be appreciated by those skilled in this art as the invention becomes better understood by reference to the following description when considered in connection with the accompanying drawing, in which—

Figure 1, is a side elevation of a chuck embodying my invention;

Fig. 2, is a similar view with the outer sleeve or casing in section to show the parts beneath in elevation;

Fig. 3, is a longitudinal section through the chuck;

Fig. 4, is a cross section taken on the line 4—4 of Fig. 2; and

Figs. 5 and 6, are cross sections taken on the lines 5—5 and 6—6 respectively of Fig. 3.

Referring more particularly to the drawing it will be observed that the chuck comprises two principal parts namely a driving shank and a chuck body designated generally by 7 and 8 respectively, and cooperating parts which will be presently described. In this case the driving shank has a tapered end 9 for connection in the socket of a driving spindle and has a spring-driving collar 11 adjacent to said tapered end and a cylindrical driven end 12 remote therefrom. Said cylindrical end of the shank fits in an axial hole 13 in the chuck body, said fit permitting rotation and lengthwise movement of said chuck body on the shank and holding said parts in axial alignment.

Driving connection is established between the shank and chuck body by a combined torsion and compression coil spring 14 embracing the shank intermediate its collar 11 and the chuck body and having its opposite ends 15 and 16 engaged in sockets in said collar and chuck body respectively. By reason of this connection the chuck body has both angular and longitudinal float upon and with respect to the driving shank; and this float is limited by contact of the projecting ends of a diametrical pin 17 in the driving shank against the ends 18 and 19 of arcuate slots in the chuck body and against the top and bottom walls 21 and 22 of said slots. In other words, the pin and slot connection affords a lost-motion positive driving connection between the shank and chuck body while the spring 14 provides a flexible or yielding driving connection between the parts. In the present case the angular float is limited to about 90°, as noted in Fig. 4, and the longitudinal float is limited to the dimension A, noted in Fig. 3. In Figs. 2, 3, and 4 the parts are shown in their relative positions with the spring 14 fully wound up so that there is positive driving of the tap which however, is not normally the case.

The tap holding means is constructed as follows: A tap driver designated generally by 23, cylindrical in cross section, fits in a diametrical hole 24 in the chuck body above its lower end and is free to shift lengthwise and rotatably therein to accommodate the tap as will be presently apparent. Said driver has an angular tool-receiving socket 25 at present in the form of a slot milled transversely through the under side of the driver body as shown in Fig. 5 to receive the square end 26 of a tap shank 27. When said tap shank is centrally located with respect to the chuck body by means which will be presently described said driver 23 will accommodate itself to the tap end 26 without binding or straining the tap and will at the same time provide a positive driving connection therewith. The tap is held in alignment with the chuck body by a bushing 28 which fits snugly in the lower end of the axial hole 13 and is removable endwise therefrom. The bushing is of a size to suit the particular tap so as to hold the latter in the desired alignment. The bushing is held from withdrawal by means of a retainer in the form of a cap 29 threaded onto the lower end of the chuck body as at 31 and having an end 32 engaging the lower end of the bushing. The tap shank is held from withdrawal from the bushing by releasable means preferably in the form of a snap ring 33 engaged in an annular groove 34 in the periphery of said tap shank and bearing against an inner shoulder 35 on the bushing. By this means the tap or tool shank is firmly held against both endwise and lateral displacement in any direction and yet may be readily removed from the chuck. Removal is effected by unscrewing the bushing retainer 29 and then withdrawing the bushing 28 from the chuck body. The tap shank may then be pushed up through the bushing until the snap ring 33 clears the retaining wall 36 in the bushing, thereby permitting the snap ring to be spread and slipped off of the tap shank.

In order to lock the bushing retainer 29 on the chuck body and to enclose the working part I provide the following construction. Over the chuck body I slip a sleeve or casing 37 which is detachably secured to said body by suitable means such as a locking screw 38. Said sleeve 37 is provided with a depending lug 39 (Figs. 3 and 6) adapted to engage in any of the circumferentially spaced notches 41 in the upper edge of the bushing retainer 29, thereby locking said retainer from rotative displacement. To unscrew said retainer for removal of the tap or tool as above described the locking screw 38 will first be removed permitting the sleeve 37 to be raised sufficiently to withdraw its lug 39 from the bushing retainer. Upon assembling the parts said bushing retainer will be turned up to position and one of its notches 41 brought into alignment with the lug 39 so that the sleeve 37 may be lowered into locking position and the screw 38 inserted, as will be obvious.

From the foregoing it will be apparent that the tapping tool is securely and positively held in the chuck body, in accurate alignment therewith and without danger of pulling out when the chuck reverses. This is due to the manner in which the tool shank is held in the chuck body and driven thereby and especially to the use of a snap ring or the equivalent for preventing withdrawal of the tool. It will also be apparent that the tap or tool will enter the work under a yielding pressure both longitudinal and angular. This is especially desirable in a tapping chuck for the reason that it permits the tap to seek its own lead and to yield under varying resistance so that as a matter of fact the tapping operation performed by a chuck such as disclosed herein simulates a hand tapping operation. Moreover the longitudinal and angular float is especially advantageous when using chucks of this kind in a multiple tapping machine as it allows each individual tap to accommodate itself to the particular conditions incident to the size and number of threads per inch of the tap and to the point in the feed of entering the work with respect to the entrance of other taps. Consequently, in view of the yielding driving connection there is no shock to the stool and breakage at any period in the operation is reduced to a minimum. The spring 14 is of such strength that ordinarily the drive pin 17 does not come in positive driving contact with the surfaces 18 or 22, but instead, provides a floating, driving connection. The pin 17 is normally in the dotted line position shown in Fig. 4 and approaches the full line position the more the spring 14 is wound up. At the end of the tapping operation, especially where a multiplicity of taps are used on a single head, considerable pressure is stored in the partially or completely tightened springs, and when the machine is reversed such stored up pressure is immediately exerted in aiding reversal of the machine so that it gets under way and is functioning to its maximum capacity at the time the greatest load is imposed, that is, when reversing the taps.

As a safety factor in the event of tap breakage I have provided means whereby the lower end of the chuck will be thrown out of alignment so as to clear the stub end of the tap jammed in the work, thus avoiding breakage or costly injury to the chuck and the machine. This is accomplished by reducing the cross section of the driving shank preferably just below its tapered end as indicated by 42, Fig. 3. It will be noted that tap breakages generally occur on an oblique line with the result that a sudden lateral thrust is imposed on the lower end of the chuck by the held end of the tap shank striking against the oblique end of the broken off tap. The cross section of the driving shank at 42 is such as to yield under said excessive lateral thrust or strain and bend sufficiently to throw the lower end of the chuck out of alignment so that the held end of the tap will clear the broken off end. The bent driving shank may be easily straightened or in case of a severe break this part may be replaced if necessary at little cost compared with the loss of an entire chuck due to breakage which often resulted with chucks available prior to my invention.

It will be noted that the construction lends itself to complete enclosure, that by inerchange of driving pars 25 and bushings 28 the chuck is adapted for a wide range of tool sizes, and that the organization of parts permits of their production at a comparatively low cost and yet serve in a very practical and durable manner the purposes intended.

It is believed that the foregoing conveys a clear understanding of the objects prefaced above and while I have illustrated but a single working embodiment it should be understood that changes might be made in details of construction without departing from the spirit and scope of the invention as expressed in the appended claims, in which—

I claim:

1. In a chuck, the combination of a driving member, a driven member, one of said members having an axial recess therein and the other having an axial part slidably received therein whereby the members are held positively in axial alignment, means providing a positive but lost motion connection between said members without affecting the axial relationship therebetween, and a torsion spring positively connected at opposite ends with said members to provide a yielding driving connection therebetween limited positively by said lost motion connection also without affecting the axial relationship of said members.

2. A chuck comprising, in combination, a driving shank, a chuck body, means positively maintaining the shank and body in axial alignment, a coiled torsion and compression spring positively connected at opposite ends to the shank and body to provide a yielding driving connection between the two parts, and means providing a lost motion connection between the two parts limiting the torsion of said spring and providing for a predetermined angular float and an appreciable longitudinal float of the chuck body with respect to the driving shank without destroying the axial alignment thereof.

3. A chuck comprising, in combination, a driving shank, a chuck body having toolholding means at one end and an axial hole at the opposite end in which the driving shank has a sliding telescoping fit serving positively to maintain the shank and body in axial alignment, a coiled torsion and compression spring providing a yielding driving connection between said shank and body, and a pin and slot connection between the shank and body to provide a positive driving connection therebetween and also a limited angular and longitudinal float of the body on the shank, said positive driving connection being effective at the limit of the angular float.

4. A chuck adapted for use in tapping comprising, in combination, a normally rigid and substantially non-resilient driving shank and a chuck body operatively connected whereby the chuck body is turned in the turning of the shank, said shank having a yield section of smaller size than the rest of the shanks but still large enough in cross-section to resist normal torsional stress in the driving of the chuck body from the shank but adapted to bend laterally under abnormal lateral strain, as for example, due to tap breakage in the work, the non-resilience of said shank causing it to remain bent out of line until bent back into line.

EVERETTE K. MORGAN.